United States Patent
Gilbert et al.

Patent Number: 5,699,188
Date of Patent: Dec. 16, 1997

[54] METAL-COATED MULTILAYER MIRROR

[75] Inventors: Laurence R. Gilbert, Marine on the St. Croix; Andrew J. Ouderkirk, Woodbury, both of Minn.

[73] Assignee: Minnesota Mining and Manufacturing Co., St. Paul, Minn.

[21] Appl. No.: 494,418

[22] Filed: Jun. 26, 1995

[51] Int. Cl.$^6$ ............... G02B 1/10; G02B 5/30
[52] U.S. Cl. ............ 359/584; 359/585; 359/494; 359/500; 359/884
[58] Field of Search ............... 359/580, 583, 359/584, 585, 586, 588, 589, 494, 495, 500, 884, 359, 352, 360

[56] References Cited

U.S. PATENT DOCUMENTS

| | | | |
|---|---|---|---|
| 3,711,176 | 1/1973 | Alfrey, Jr. et al. | 359/359 |
| 4,674,840 | 6/1987 | Bennett | 359/64 |
| 4,795,246 | 1/1989 | Lord | 359/494 |
| 4,937,134 | 6/1990 | Schrenk et al. | 359/580 |
| 5,004,308 | 4/1991 | Hall et al. | 359/884 |
| 5,061,042 | 10/1991 | Nakamura et al. | 359/500 |
| 5,096,520 | 3/1992 | Faris | 359/37 |
| 5,103,337 | 4/1992 | Schrenk et al. | 359/359 |
| 5,122,905 | 6/1992 | Wheatley et al. | 359/500 |
| 5,122,906 | 6/1992 | Wheatley | 359/500 |
| 5,173,800 | 12/1992 | King | 359/585 |
| 5,233,465 | 8/1993 | Wheatley et al. | 359/359 |
| 5,278,694 | 1/1994 | Wheatley et al. | 359/359 |
| 5,301,069 | 4/1994 | Wood et al. | 359/580 |

FOREIGN PATENT DOCUMENTS

| | | | |
|---|---|---|---|
| 270600A1 | 8/1989 | Germany | 359/884 |
| 51-127003 | 5/1993 | Japan | 359/884 |

*Primary Examiner*—Jon W. Henry
*Attorney, Agent, or Firm*—Gary L. Griswold; Walter N. Kirn, Jr.; Stephen W. Buckingham

[57] ABSTRACT

A metal-coated multilayer mirror having high reflectivity and high specularity. The mirror comprises a multilayered polymer film and a reflective metal layer. The multilayered polymer film preferably comprises layers of a crystalline, semi-crystalline, or liquid crystalline material, such as a naphthalene dicarboxylic acid polyester, having an average thickness of not more than 0.5 microns and layers of a second polymer having an average thickness of not more than 0.5 microns. Preferably, the layers of semi-crystalline naphthalene dicarboxylic acid polyester have a positive stress optical coefficient. The reflective metal layer comprises a metal selected from the group consisting of silver, gold, aluminum, nickel, copper, and titanium, with silver and aluminum being particularly preferred. The metal-coated multilayer mirrors are useful in applications requiring broad bandwidth reflection, high specularity, low manufacturing costs, and high reflectivity.

44 Claims, 15 Drawing Sheets

METAL-COATED MULTILAYER MIRROR

BACKGROUND

The present invention relates to optical films useful, e.g., as mirrors, which are combined with a reflective metal layer to form broadband, high reflectivity mirrors having high specularity.

Light-reflecting devices based upon multiple polymeric layers are known. Examples of such devices include polarizers made of alternating polymeric layers in which the layers have different refractive indices. Mirrors made from smooth, reflective metal surfaces are also known.

SUMMARY

The optical properties and design considerations of birefringent optical films described herein allow the construction of multilayer stacks for which the Brewster angle (the angle at which reflectance of p polarized light goes to zero) is very large or is nonexistent for the polymer layer interfaces. This allows for the construction of multilayer mirrors whose reflectivity for p polarized light decreases slowly with angle of incidence, is independent of angle of incidence, or increases with angle of incidence away from the normal. As a result, multilayered films having high reflectivity (for both s and p polarized light for any incident direction in the case of mirrors) over a wide bandwidth can be achieved. These multilayered films are combined with a reflective metal layer, such as silver or aluminum, to provide mirrors having high reflectivity and high specularity.

Briefly, the present invention includes a multilayered polymer film in which the layers have an average thickness of not more than 0.5 microns. More particularly, in one aspect of the present invention the multilayered polymer film comprises layers of a birefringent polymer, especially a crystalline, semi-crystalline, or liquid crystalline material, such as naphthalene dicarboxylic acid polyester, for example a 2,6-polyethylene naphthalate ("PEN") or a copolymer derived from ethylene glycol, naphthalene dicarboxylic acid and some other acids such as terephthalate ("coPEN"), having an average thickness of not more than 0.5 microns, and preferably with a positive stress optical coefficient, i.e., upon stretching, its index of refraction in the stretch direction increases; and layers of a selected second polymer, for example a polyethylene terephthalate ("PET") or a coPEN, having an average thickness of not more than 0.5 microns. Preferably, after stretching these multilayered polymer films in at least one direction, the layers of said naphthalene dicarboxylic acid polyester have a higher index of refraction associated with at least one in-plane axis than the layers of the second polymer.

Another aspect of the present invention includes a multilayered polymer film comprising layers of a birefringent polymer, especially a crystalline, semi-crystalline, or liquid crystalline material, for example a polyester such as PET polymer, having an average thickness of not more than 0.5 microns; and layers of a selected second polymer, for example a polyester or a polystyrene, having an average thickness of not more than 0.5 microns; wherein said film has been stretched in at least one direction to at least twice that direction's unstretched dimension.

The multilayered polymer films used in the present invention are combined with a reflective metal layer, preferably silver or aluminum, to provide a high reflectivity mirror also having high specularity. The reflective metal layer may be deposited on the multilayered polymer film by conventional means, such as vacuum deposition, cathode sputtering, and the like, or it may be a separate metalized polymer or glass sheet or a metal sheet that is laminated to the multilayered polymer film, such as by a suitable transparent adhesive. The resulting metal-coated multilayer mirror has higher reflectivity than either the multilayered polymer film or the reflective metal alone, higher color uniformity than known multilayered polymer films, and provides desired manufacturing flexibility.

BRIEF DESCRIPTION OF THE DRAWINGS

The invention will be further explained with reference to the drawings.

DETAILED DESCRIPTION OF ILLUSTRATIVE EMBODIMENTS

Figure 1A:
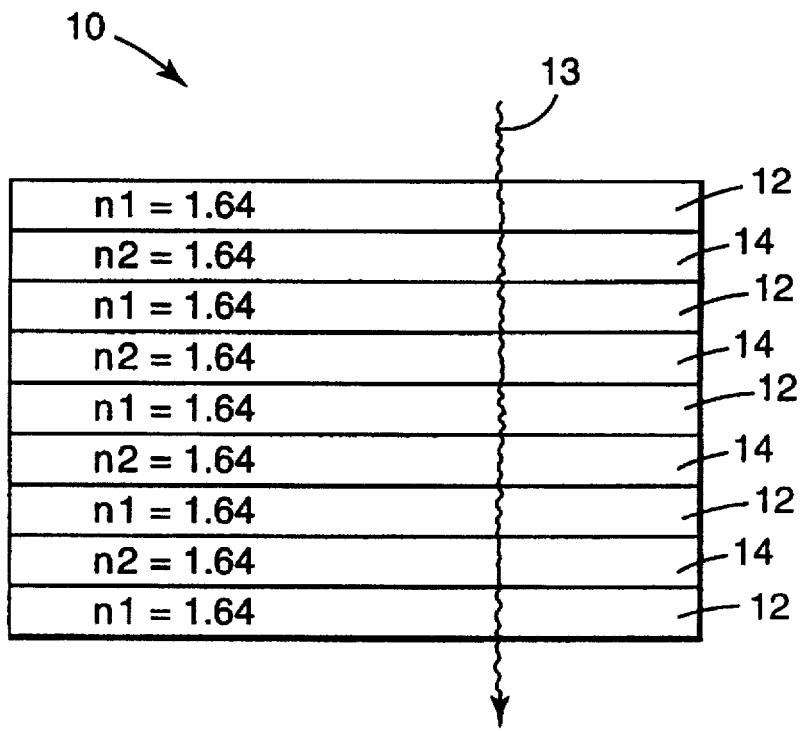
FIGS. 1a and 1b are diagrammatical views of the polarizer of the present invention.
Figure 1B:
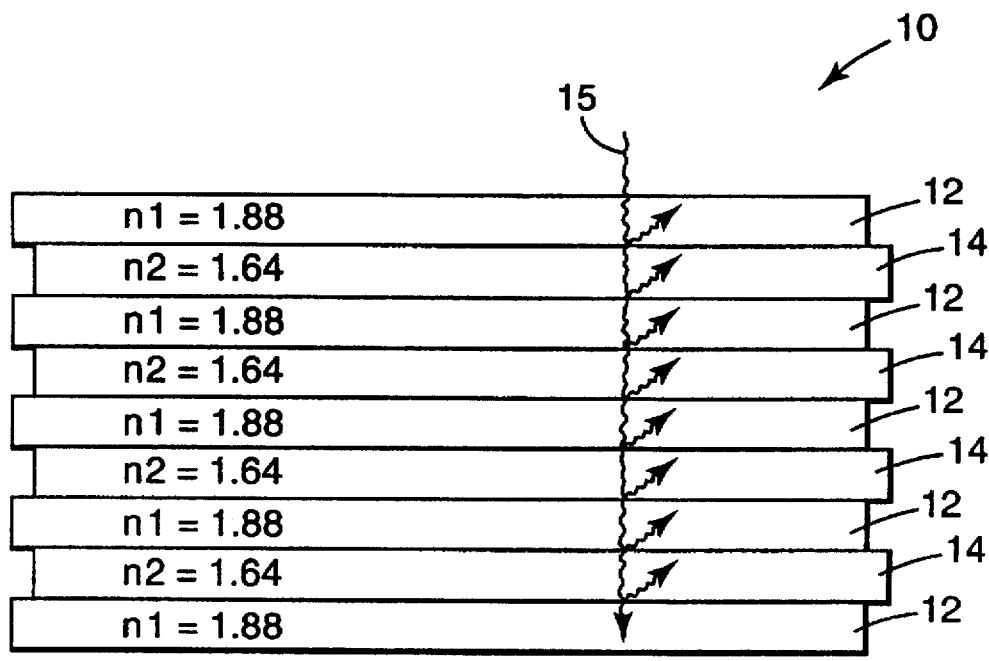

The present invention as illustrated in FIGS. 1a and 1b includes a multilayered polymer film 10, also referred to herein as a multilayer stack, having alternating layers of at least two materials 12 and 14. Preferably, at least one of the materials has the property of stress induced birefringence, such that the index of refraction (n) of the material is affected by the stretching process. FIG. 1a shows an exemplary multilayer stack before the stretching process in which both materials have the same index of refraction. Light ray 13 experiences relatively little change in index of refraction and passes through the stack. In FIG. 1b, the same stack has been stretched, thus increasing the index of refraction of material 12 in the stretched direction or directions. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors. If stretched biaxially, the sheet can be stretched asymmetrically along orthogonal axes or symmetrically along orthogonal axes to obtain desired polarizing and reflecting properties.

The optical properties and design considerations of multilayer stacks is described most completely in copending and commonly assigned U.S. patent application 08/402,041, filed Mar. 10, 1995, the disclosure of which is hereby incorporated herein by reference. Very briefly, that application describes the construction of multilayer stacks (mirrors and polarizers) for which the Brewster angle (the angle at which reflectance goes to zero) is very large or is nonexistent for the polymer layer interfaces. This allows for the construction of multilayer mirrors and polarizers whose reflectivity for p polarized light decreases slowly with angle of incidence, is independent of angle of incidence, or increases with angle of incidence away from the normal. As a result, multilayer stacks having high reflectivity for both s and p polarized light over a wide bandwidth, and over a wide range of angles can be achieved.

Figure 2:
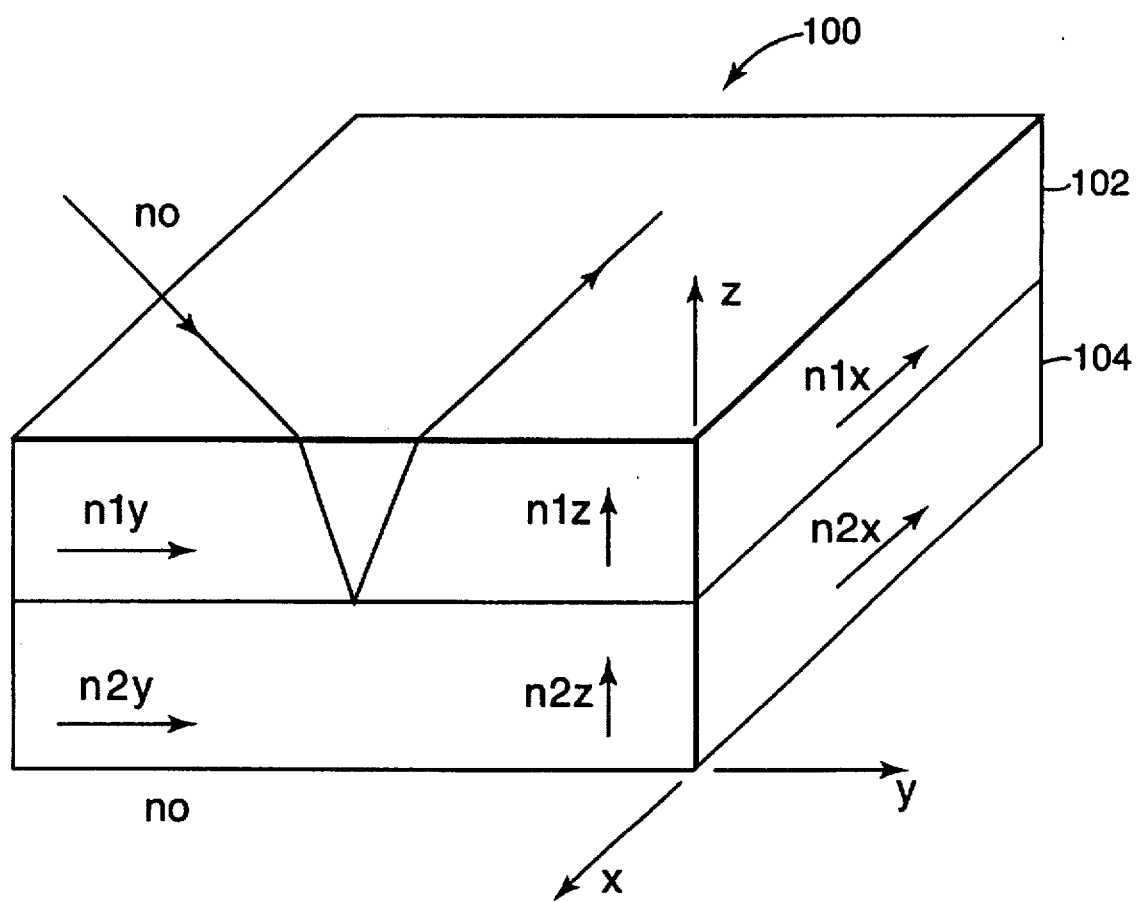
FIG. 2 shows a two layer stack of films forming a single interface.

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce devices having the desired optical properties. Many useful devices, such as mirrors and polarizers having a wide range of performance characteristics, can be designed and fabricated using the principles described therein.

Referring again to FIG. 1, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to design or "tune" the multilayer stack such that the "blue" layers are on the incident side of the multilayer stack.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. Preferably, the layers have a ¼ wavelength thickness with different sets of layers designed to reflect different wavelength ranges. Each layer does not have to be exactly ¼ wavelength thick. The overriding requirement is that the adjacent low/high index film pair have a total optical thickness of 0.5 wavelength.

As noted above, the multilayered polymer films used in the present invention include layers that can be made from any number of different materials, including chemically identical materials having different physical properties, which have an average thickness of not more than 0.5 microns. Preferably, the multilayered polymer film comprises layers of a crystalline, semi-crystalline, or liquid crystalline polymer, such as naphthalene dicarboxylic acid polyester having a positive stress optical coefficient, i.e., upon stretching, its index of refraction in the stretch direction increases, and layers of a selected second polymer. After stretching such multilayered polymer films in at least one direction, the layers of the naphthalene dicarboxylic acid polyester preferably have a higher index of refraction associated with at least one in-plane axis than the layers of the second polymer. Particularly preferred semi-crystalline naphthalene dicarboxylic acid polyesters include, for example, a 2,6-polyethylene naphthalate ("PEN") or a copolymer derived from ethylene glycol, naphthalene dicarboxylic acid, and some other acids such as terephthalate ("coPEN"). Particularly, preferred selected second polymers include, for example, a polyethylene terephthalate ("PET") or a coPEN.

The multilayered polymer films alternately may comprise layers of a birefringent polymer, especially a crystalline, semi-crystalline, or liquid crystalline material, for example a semi-crystalline polyester such as PET, and of a second selected polymer in which the layers have an average thickness of not more than 0.5 microns, and the films are stretched in at least one direction to at least twice that direction's unstretched dimension.

When the multilayered polymer films used in the present invention include a semi-crystalline naphthalene dicarboxylic acid polyester, it preferably exhibits a difference in refractive indices associated with different in-plane axes of at least 0.05 and preferably above 0.20. PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The birefringence (difference in refractive index) can be increased by increasing the molecular orientation. Although PEN has been specifically discussed above as the preferred polymer for the birefringent layer, polybutylene naphthalate is also a suitable material as well as other crystalline or semi-crystalline naphthalene dicarboxylic acid polyesters.

The polymers used to make the multilayer stacks preferably have similar melt viscosities so as to obtain uniform multilayer coextrusion. When two different polymers are used, the two polymers preferably have a melt viscosity within a factor of 5 at shear rates typically experienced in coextrusion. The preferred selected polymer layers of the present invention also exhibit good adhesion properties to each other while still remaining as discrete layers within the multilayered sheet. The glass transition temperatures of the polymers used in the present invention are compatible so adverse effects such as cracking of one set of polymer layers during stretching does not occur. For mirrors that predominantly reflect in one polarization, the preferred selected polymer layer remains isotropic in refractive index and substantially matches the refractive index of the other layer associated with the transverse axis as illustrated in FIG. 1a. Light with its plane of polarization in this direction will be predominantly transmitted by the polarizer while light with its plane of polarization in the oriented direction will be reflected as illustrated in FIG. 1b.

To make a mirror, two uniaxially stretched polarizing sheets are positioned with their respective orientation axes rotated 90°, or the sheet 10 (FIG. 1b) is biaxially stretched. In the latter case, both refractive indices in the plane of the sheet for a layer made from PEN increase and the selected polymer should be chosen with as low of a refractive index as possible to reflect light of both planes of polarization. Biaxially stretching the multilayered sheet will result in differences between refractive indices of adjoining layers for planes parallel to both axes, thereby resulting in reflection of light in both planes of polarization directions. Differences between the transverse—axis—associated indices of refraction of adjoining layers after stretching should be less than 0.1 and preferably less than 0.05.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than about 30%, preferably less than about 20% and more preferably less than about 10%. A desirable average transmission along each stretch direction at normal incidence for a partial mirror ranges anywhere from, for example, about 10% to about 50%, and can cover a bandwidth of anywhere between, for example, 100 nm and 450 nm, depending upon the particular application. For a high efficiency mirror, average transmission along each stretch direction at normal incidence over the visible spectrum (380–750 nm) is desirably less than about 10%, preferably less than about 5%, more preferably less than about 2%, and even more preferably less than about 1%. In addition, asymmetric mirrors may be desirable for certain applications. In that case, average transmission along one stretch direction may be desirably less than, for example, about 50%, while the average transmission along the other stretch direction may be desirably less than, for example, about 20%, over a bandwidth of, for example, the visible spectrum (380–750 nm), or over the visible spectrum and into the near infrared (e.g. 380–850 nm).

If desired, two or more sheets of the invention may be used in a composite to increase reflectivity, optical bandwidth, or both, or to form a mirror from two polarizers. If the optical thicknesses of pairs of layers within the sheets are substantially equal, the composite will reflect, at somewhat greater efficiency, substantially the same bandwidth and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic, or cyclohexanedicarboxylic acid to attain the lowest possible refractive index while still maintaining adhesion to the layers made from, e.g., PEN. It is not required that the selected polymer be a copolyester or copolycarbonate. Preferably, the selected polymer has an index of refraction of less than about 1.65 and more preferably an index of refraction of less than about 1.55.

Multilayer reflecting polarizers can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrowband polarizer across a 100 nm bandwidth is desirably at least about 50%, preferably at least about 70% and more preferably at least about 90%. The average transmission at 60 degrees from the normal for p polarized light (measured along the transmission axis) for a narrow band polarizer across a 100 nm bandwidth is desirably at least about 50%, preferably at least about 70% and more preferably at least about 80%.

The average transmission at normal incidence for a polarizer in the transmission axis across most of the visible spectrum (400–700 nm for a bandwidth of 300 nm) is desirably at least about 50%, preferably at least about 70%, more preferably at least about 85%, and even more preferably at least about 90%. The average transmission at 60 degrees from the normal (measured along the transmission axis) for a polarizer from 400–700 nm is desirably at least about 50%, preferably at least about 70%, more preferably at least about 80%, and even more preferably at least about 90%.

For certain applications, high reflectivity in the transmission axis at off-normal angles are preferred. The average reflectivity for light polarized along the transmission axis should be more than 20% at an angle of at least 20 degrees from the normal.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} ((T - \overline{T})^2)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest.

For applications where a low color polarizer is desirable, the % RMS color should be less than about 10%, preferably less than about 8%, more preferably less than about 3.5%, and even more preferably less than about 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than about 50%, preferably less than about 30%, more preferably less than about 10%, and even more preferably less than about 3%. For polarizers having a bandwidth within the visible range (400–700 nm, or a bandwidth of 300 nm), average transmission along the extinction axis at normal incidence is desirably less than about 40%, more desirably less than about 25%, preferably less than about 15%, more preferably less than about 5% and even more preferably less than about 3%.

Materials Selection and Processing

With the design considerations described in the above mentioned U.S. patent application Ser. No. 08/402,041, one of ordinary skill will readily appreciate that a wide variety of materials can used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline, semi-crystalline, or liquid crystalline material, preferably a polymer. The second material, in turn, may be crystalline, semi-crystalline, or amorphous. It should be understood that in the polymer art it is generally recognized that polymers are typically not entirely crystalline, and therefore in the context of the present invention, crystalline or semi-crystalline polymers refer to those polymers that are not amorphous and includes any of those materials commonly refered to as crystalline, partially crystalline, semi-crystalline, etc. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g. , copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a coPEN.

Particularly preferred combinations of layers in the case of polarizers include PEN/coPEN, polyethylene terephthalate (PET)/coPEN, PEN/sPS, PET/sPS, PEN/Eastar, and PET/Estar, where "coPEN" refers to a copolymer or blend based upon naphthalene dicarboxylic acid (as described above) and "Estar" is polycyclohexanedimethylene terephthalate commercially available from Eastman Chemical Co.

Particularly preferred combinations of layers in the case of mirrors include PET/Ecdel, PEN/Ecdel, PEN/sPS, PEN/THV, PEN/coPET, and PET/sPS, where "coPET" refers to a copolymer or blend based upon terephthalic acid (as described above), "Ecdel" is a thermoplastic polyester commercially available from Eastman Chemical Co., and "THV" is a fluoropolymer commercially available from 3M Co.

The number of layers in the device is selected to achieve the desired optical properties using the minimum number of layers for reasons of film thickness, flexibility and economy. In the case of both polarizers and mirrors, the number of layers is preferably less than about 10,000, more preferably less than about 5,000, and (even more preferably) less than about 2,000.

As discussed above, the ability to achieve the desired relationships among the various indices of refraction (and thus the optical properties of the multilayer device) is influenced by the processing conditions used to prepare the multilayer device. In the case of organic polymers which can be oriented by stretching, the devices are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirrors the film is stretched substantially in two directions (biaxial orientation).

The film may be allowed to dimensionally relax in the cross-stretch direction from the natural reduction in cross-stretch, (equal to the square root of the stretch ratio) to being constrained (i.e., no substantial change in cross-stretch dimensions). The film may be stretched in the machine direction, as with a length orienter, and/or in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratio in the range from about 1:2 to about 1:10 (more preferably about 1:3 to about 1:7) in the stretch direction and from about 1:0.2 to about 1:10 (more preferably from 1:0.2 to about 1:7) orthogonal to the stretch direction is preferred.

Suitable multilayer devices may also be prepared using techniques such as spin coating, e.g., as described in Boese et at., J. Polym. Sci.: Part B, 30:1321 (1992) for birefringent polyimides, and vacuum deposition, e.g. , as described by Zang et. al., Appl. Phys. Letters, 59:823 (1991) for crystalline organic compounds; the latter technique is particularly useful for certain combinations of crystalline organic compounds and inorganic materials.

Reflective Metal Layer

The multilayered polymer films described above are combined with a reflective metal layer to provide a metal-coated multilayer mirror having higher reflectivity than either the multilayered polymeric film or the reflective metal alone, higher color uniformity than known polymer-based multilayer mirrors, and desirable manufacturing flexibility.

The reflective metals useful in the present invention are those having smooth, reflective metal surfaces with a high degree of specular reflectivity. Any reflective metal may be used, although preferred metals include silver, gold, aluminum, copper, nickel, and titanium. Silver and aluminum are particularly preferred.

The reflective metal layer may be applied to the multilayered polymer films by conventional coating techniques well-known to those of ordinary skill in this art. Such known processes include pyrolysis, powder coating, vapor deposition, cathode sputtering, ion plating, and the like. Cathode sputtering and vapor deposition are often preferred in view of the uniformity of structure and thickness that can be obtained. Alternately, the reflective metal may be a separate metal sheet, such as a metal foil or a metalized polymer or glass sheet, that is laminated to the multilayered polymer film by means of a suitable adhesive, for example, a hot melt adhesive such as the VITEL 3300 adhesive from Shell Chemical Company, 4040 Embassy Parkway, Akron, Ohio 44333, or a pressure sensitive adhesive such as a 90/10 IOA/AA or a 95/5 IOA/acrylamide acrylic PSAs from 3M Company, St. Paul, Minn. 55144.

The thickness of the reflective metal or metalized layer applied to the multilayered polymer films to form the metal-coated multilayer mirrors of the present invention can be selected to provide the desired reflectivity. By adjusting the thickness of the metal layer for a particular metal, the reflective layer can provide the desired reflectivity in the desired bandwidth. The reflective metal layer must be thick enough to reflect the desired amount of visible light; preferably, the reflective metal layer is at least about 75 nm to about 100 nm thick for metals such as silver and gold, and at least about 20 nm to about 30 nm thick for metals such as aluminum, nickel, and titanium, although in typical production all of these metals are coated to a thickness of about 50 nm to about 100 nm. These thickness ranges are suitable whether the reflective metal layer is applied as a coating or as a separate metalized sheet.

The metal-coated multilayer mirrors of the present invention have desirable optical properties in that they have high specularity and high reflectivity over a broad bandwidth. Preferably, the mirrors of the present invention have a reflectivity of more than about 90% in the visible range of the spectrum, preferably more than about 95%, and most preferably more than about 99%.

The metal-coated multilayer mirrors of the present invention may be laminated to a rigid support, typically aluminum or steel sheet metal, to be used effectively as is well known to those of ordinary skill in the art. The rigid support can then be bent and sized for proper optical configuration. Alternatively, the metal support may be the metal layer in the metal-coated multilayer mirror of the present invention. For those applications using multiple reflections, the specularity of the reflection is important. The surface smoothness of the support can affect the specular reflection, with more expensively prepared surfaces producing higher specular reflections.

When supported in such a manner, the metal-coated multilayer mirror of the present invention can be used in those applications where light is efficiently diverted with a high degree of specularity. Combining a reflective metal layer with a multilayered polymer film that reflects visible light to form the metal-coated multilayer mirror of the present invention reduces the amount of color that results from edge banding and leaks in the band center. Thus, mirrors of the present invention are useful in applications requiring broad bandwidth reflection, high specularity, low manufacturing costs, and high reflectivity. Examples include solar reflectors, light pipes, fluorescent light reflectors, reflectors for back lights in liquid crystal displays, back lights for computer displays, sign back lighting, and retroreflective sheeting. While each of these varied applications have particular requirements unique to that application, all of them rely on efficient and highly specular reflection. Other uses would be apparent to those of ordinary skill in this art where high specularity is desired, e.g., applications requiring a large number of reflections.

In order to more fully and clearly describe the present invention so that those skilled in the art may better understand how to practice the present invention, the invention will now be described by way of the following examples. The examples are intended to illustrate the invention and should not be construed as limiting the invention disclosed and claimed herein in any manner.

EXAMPLE 1

(PET:Ecdel, 601, Mirror)

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method (such as that described in U.S. Pat. No. 3,801,429) was used to generate 151 layers which was passed through two multipliers producing an extrudate of 601 layers. U.S. Pat. No. 3,565,985 describes exemplary coextrusion multipliers. The web was length oriented to a draw ratio of about 3.6 with the web temperature at about 210° F. The film was subsequently preheated to about 235° F. in about 50 seconds and drawn in the transverse direction to a draw ratio of about 4.0 at a rate of about 6% per second. The film was then relaxed about 5% of its maximum width in a heat-set oven set at 400° F. The finished film thickness was 2.5 mil.

Figure 3:
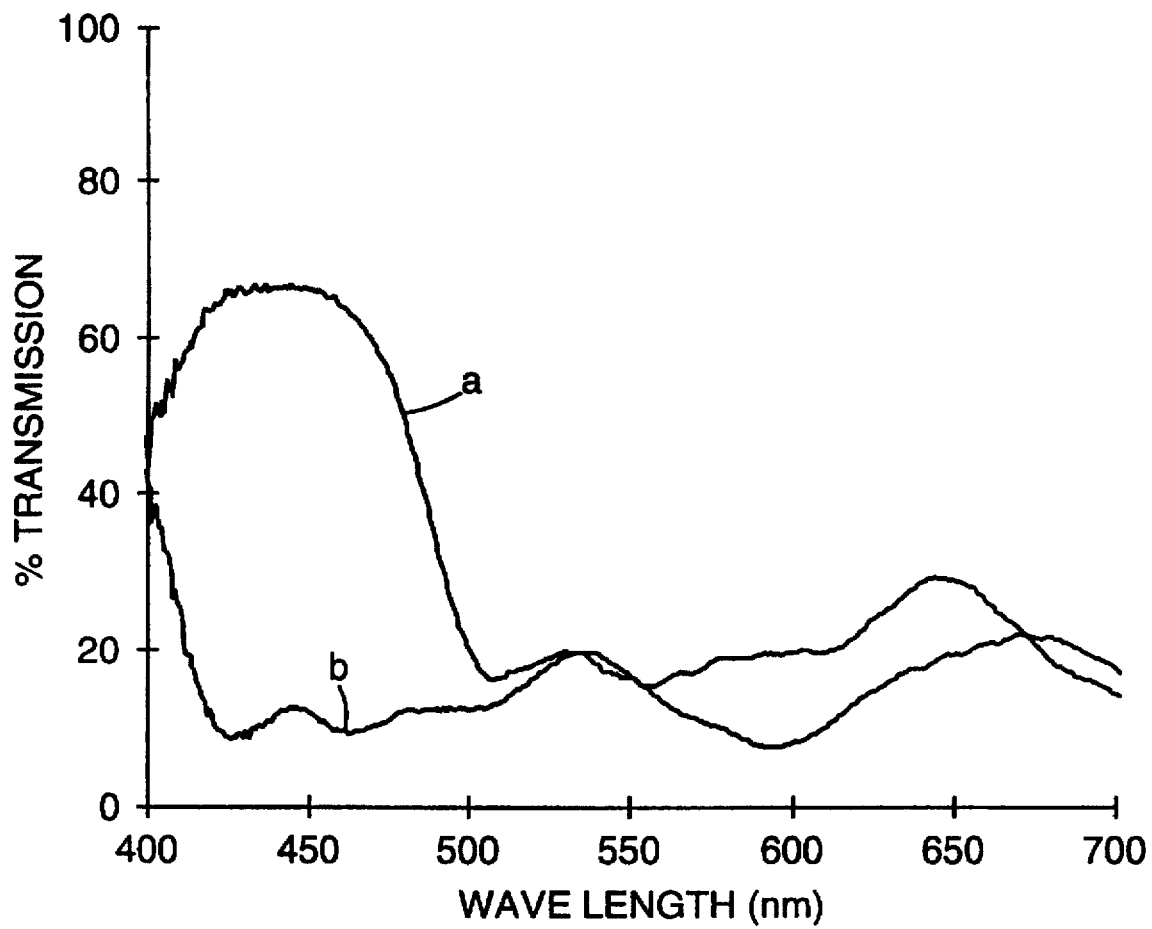
FIGS. 3–8 show the optical performance of multilayer mirrors given in Examples 1–4.

The cast web produced was rough in texture on the air side, and provided the transmission as shown in FIG. 3. The % transmission for p polarized light polarized in the non-stretched direction at a 60° angle (curve b) is similar the value at normal incidence (curve a) (with a wavelength shift).

Figure 4:
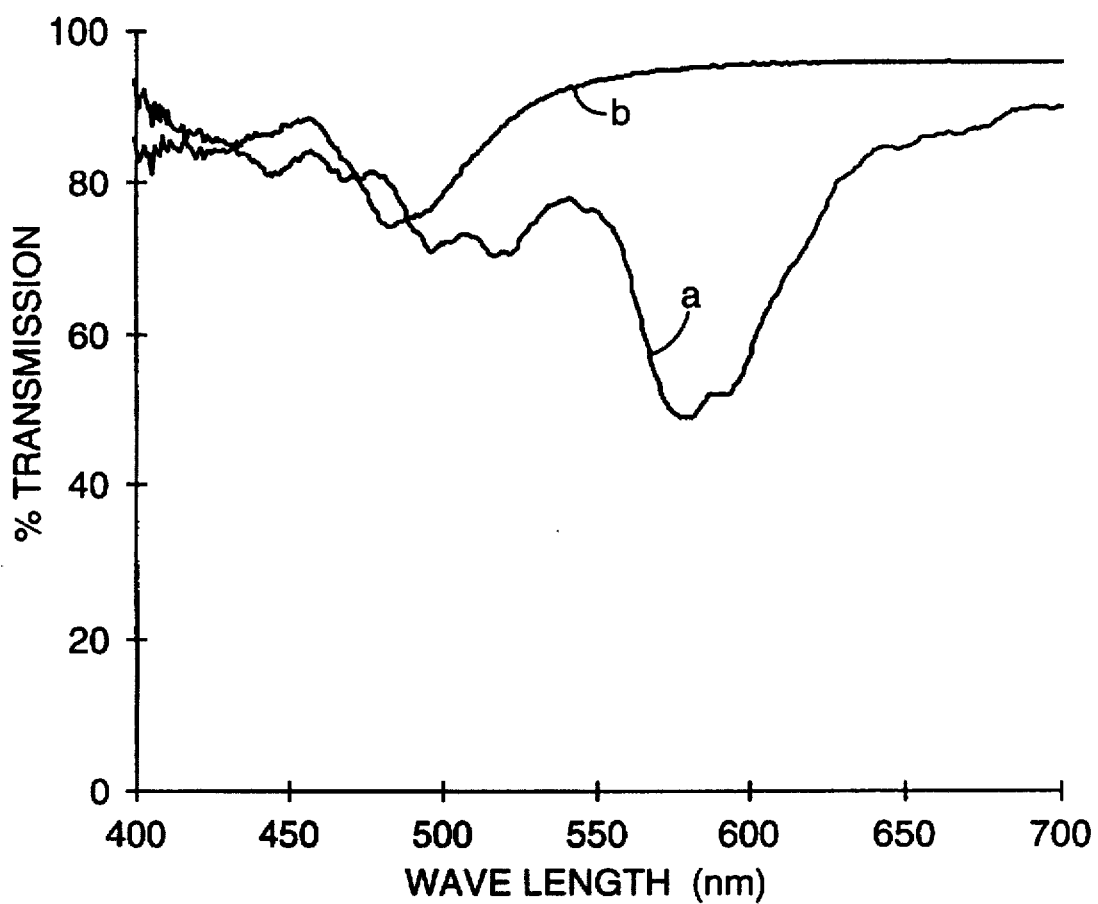

For comparison, film made by Mearl Corporation, presumably of relatively isotropic materials (see FIG. 4) shows a noticeable loss in reflectivity for p polarized light at a 60° angle (curve b, compared to curve a for normal incidence).

EXAMPLE 2

(PET:Ecdel, 151, Mirror)

A coextruded film containing 151 layers was made on a sequential flat-film-making line via a coextrusion process. A polyethylene terephthalate (PET) with an Intrinsic Viscosity of 0.6 dl/g (60 wt phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method was used to generate 151 layers. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about 25% per second. The film was then relaxed about 5% of its maximum width in a heat-set oven set at 400° F. in about 6 seconds. The finished film thickness was about 0.6 mil.

Figure 5:
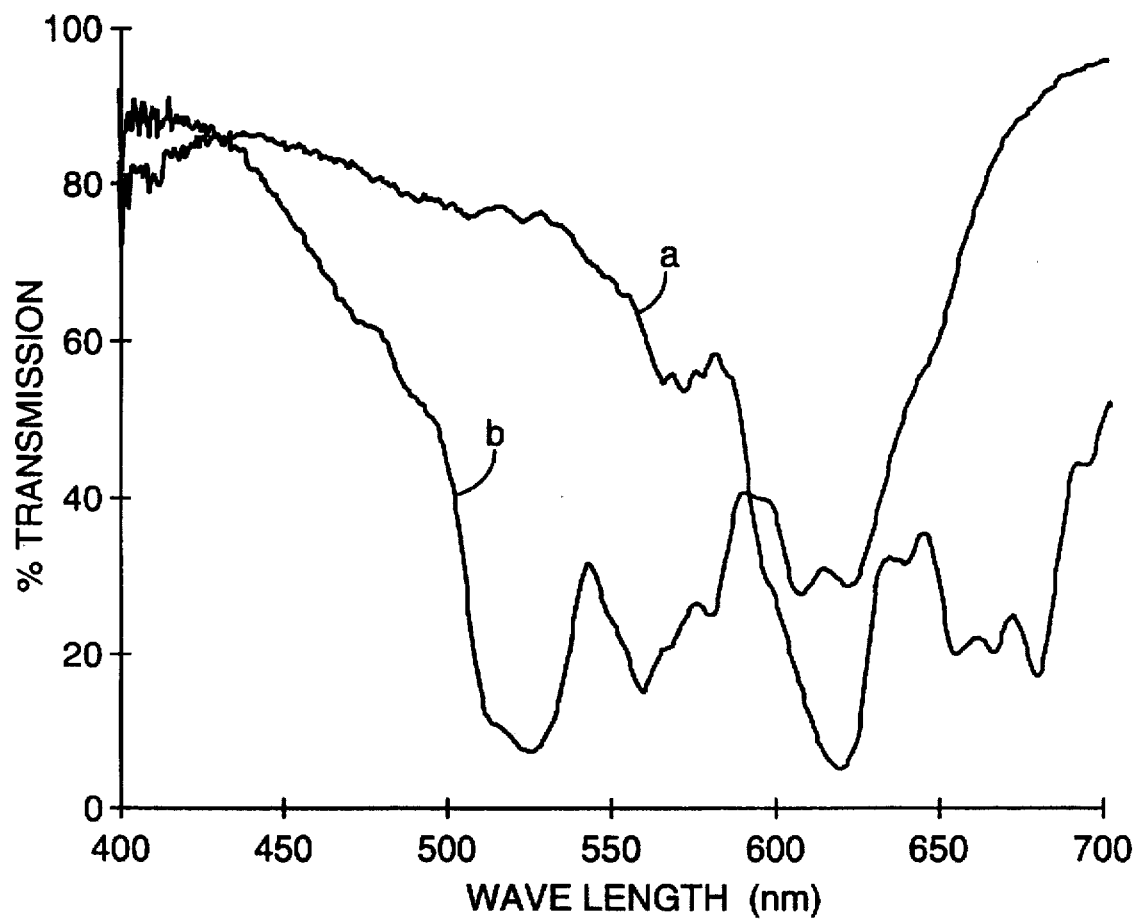
Figure 6:
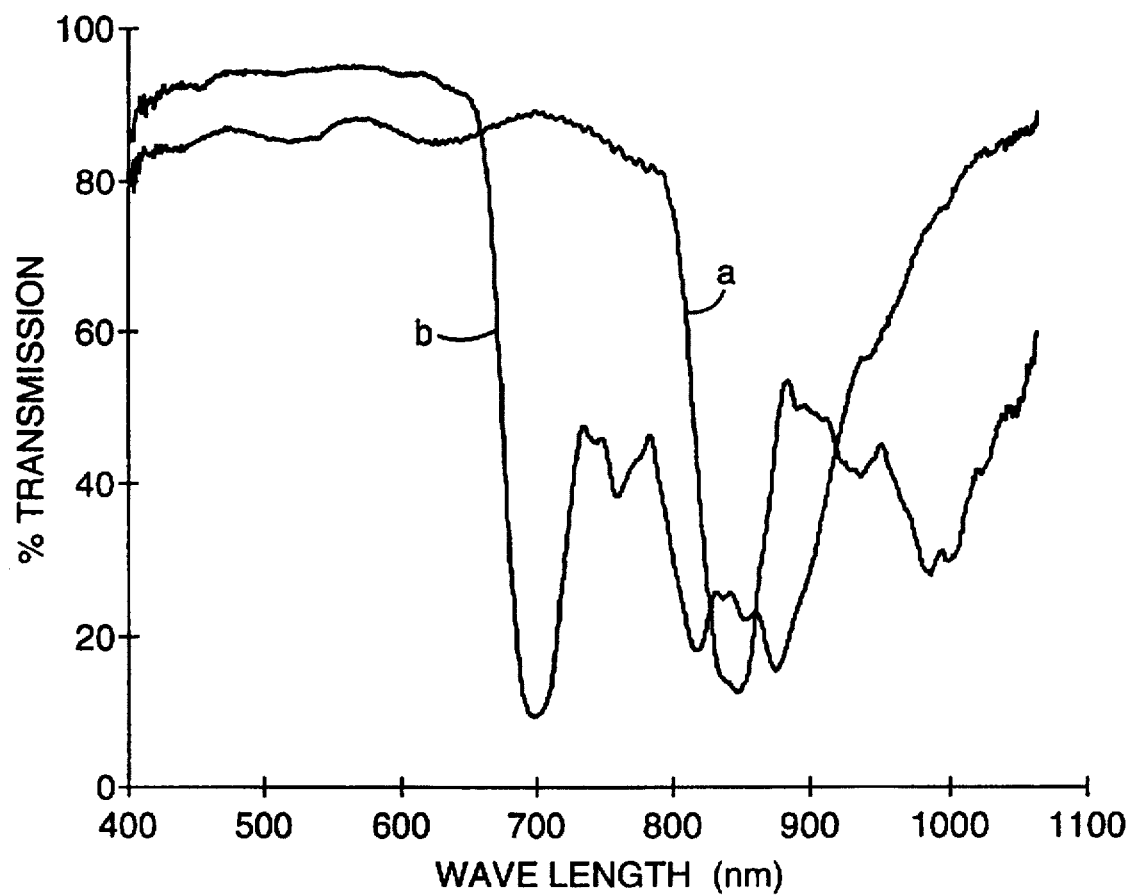

The transmission of this film is shown in FIG. 5. The % transmission for p polarized light polarized in the non-stretched direction at a 60° angle (curve b) is similar the value at normal incidence (curve a) with a wavelength shift. At the same extrusion conditions the web speed was slowed down to make an infrared reflecting film with a thickness of about 0.8 mils. The transmission is shown in FIG. 6 (curve a at normal incidence, curve b at 60 degrees).

EXAMPLE 3

(PEN:Ecdel, 225, Mirror)

A coextruded film containing 225 layers was made by extruding the cast web in one operation and later orienting the film in a laboratory film-stretching apparatus. A polyethylene naphthalate (PEN) with an Intrinsic Viscosity of 0.5 dl/g (60 wt. % phenol/40 wt. % dichlorobenzene) was delivered by one extruder at a rate of 18 pounds per hour and Ecdel 9966 (a thermoplastic elastomer available from Eastman Chemical) was delivered by another extruder at a rate of 17 pounds per hour. The PEN was on the skin layers. The feedblock method was used to generate 57 layers which was passed through two multipliers producing an extrudate of 225 layers. The cast web was 12 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 130° C. in 60 seconds. Stretching then commenced at 100%/sec (based on original dimensions) until the sample was stretched to about 3.5×3.5. Immediately after the stretching the sample was cooled by blowing room temperature air on it.

Figure 7:
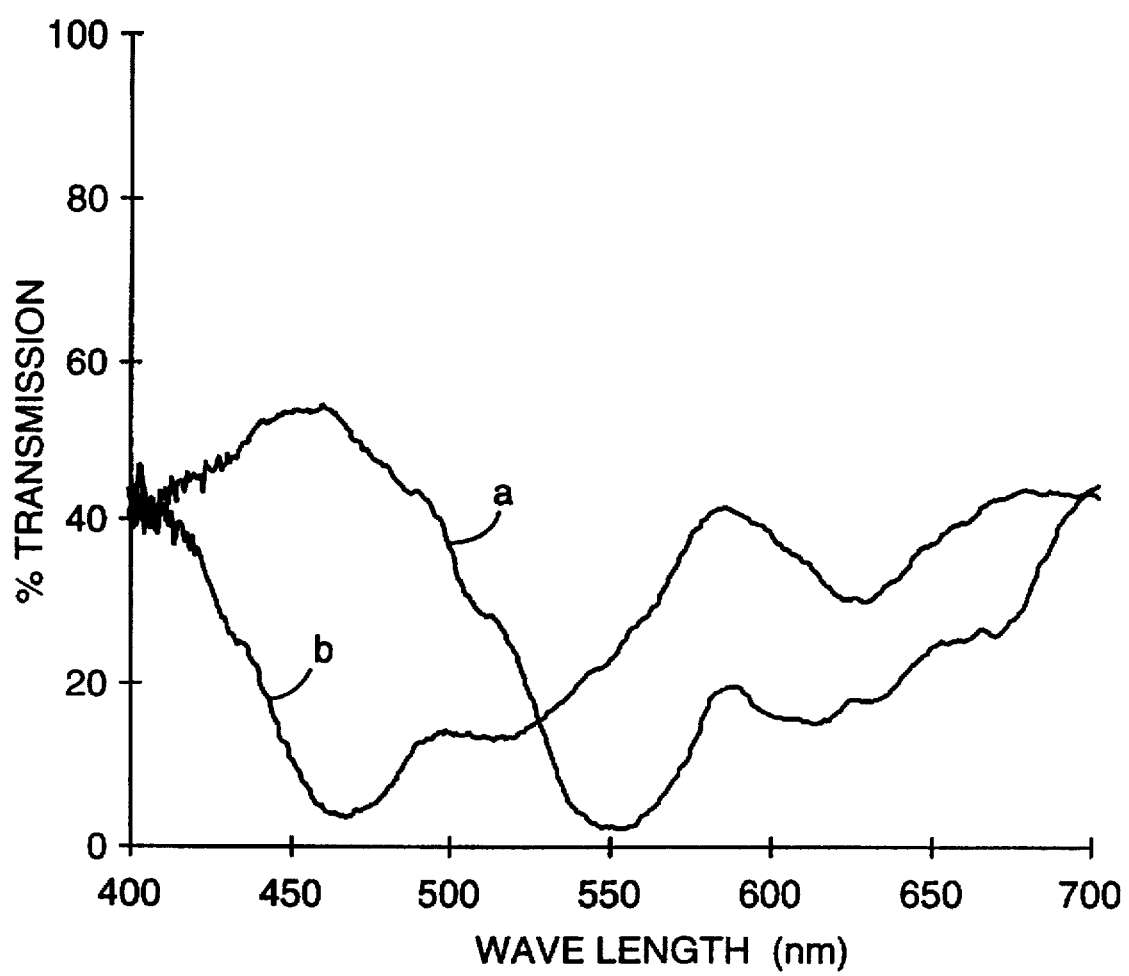

FIG. 7 shows the optical response of this multilayer film (curve a at normal incidence, curve b at 60 degrees). Note that the % transmission for p polarized light polarized in the non-stretched direction at a 60° angle is similar to what it is at normal incidence (with some wavelength shift).

EXAMPLE 4

(PEN:THV 500, 449, Mirror)

A coextruded film containing 449 layers was made by extruding the cast web in one operation and later orienting the film in a laboratory film-stretching apparatus. A polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 8:
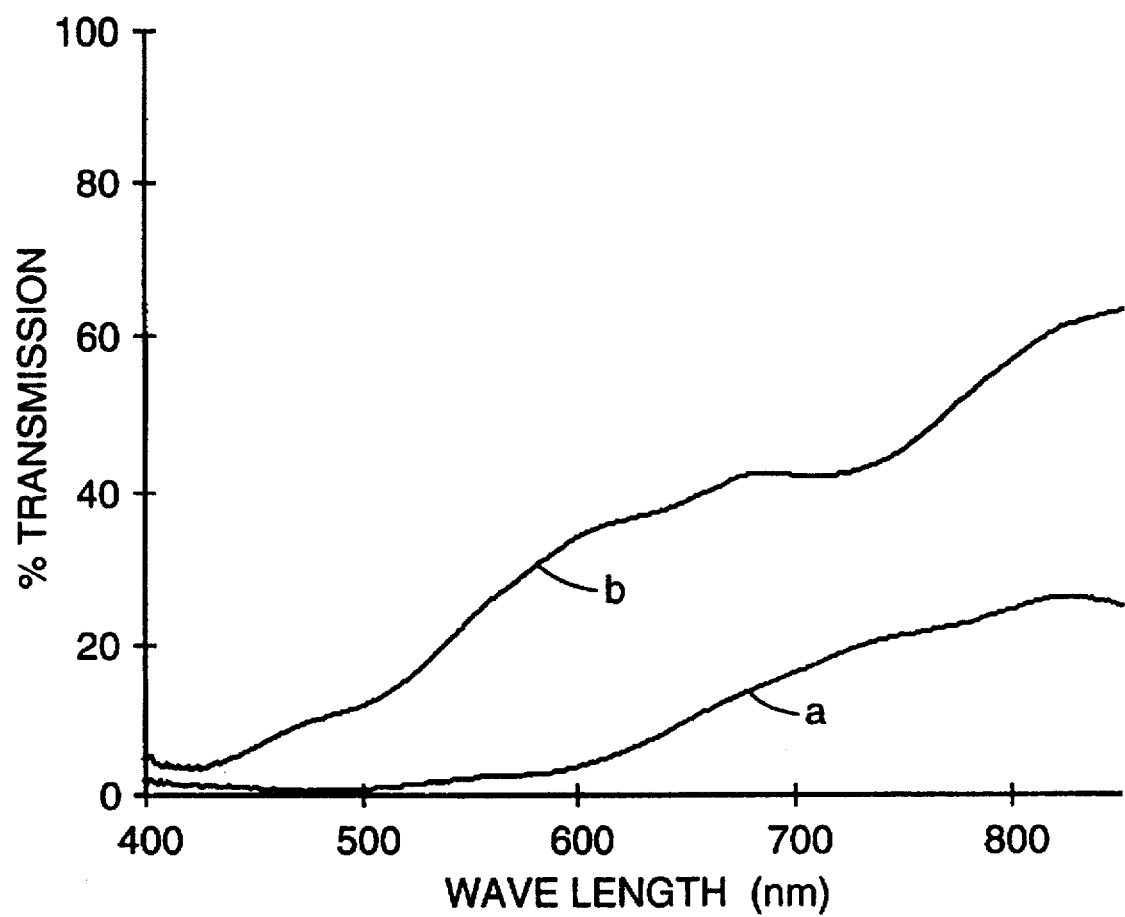

FIG. 8 shows the transmission of this multilayer film. Again, curve a shows the response at normal incidence, while curve b shows the response at 60 degrees for p-polarized light polarized in the non-stretched direction.

EXAMPLE 5

(PEN:coPEN, 601—High Color Polarizer)

A coextruded film containing 601 layers was produced by extruding the web and two days later orienting the film on a different tenter than described in all the other examples. A polyethylene naphthalate (PEN) with an Intrinsic Viscosity of 0.5 dl/g (60 wt. % phenol/40 wt. % dichlorobenzene) was delivered by one extruder at a rate of 75 pounds per hour and a coPEN (70 mol% 2,6 NDC [a methyl ester of naphthalene dicarboxylic acid] and 30 mol% DMT [dimethyl terephthalate]) with an IV of 0.55 dl/g (60 wt. % phenol/40 wt. % dichlorobenzene) was delivered by another extruder at a rate of 65 pounds per hour. The feedblock method was used to generate 151 layers, and was designed to produce a gradient distribution of layers with a ratio of thickness of the optical layers of 1.22 for PEN and 1.22 for coPEN. The PEN skin layers were coextruded on the outside of the optical stack with a total thickness of about 8% of the coextruded layers. The optical stack was passed through two multipliers producing an extrudate of 601 layers. U.S. Pat. No. 3,565, 985 describes similar coextrusion multipliers. All stretching was done in the tenter. The film was preheated to about 280° F. in about 20 seconds and drawn in the transverse direction to a draw ratio of about 4.4 at a rate of about 6% per second. The film was then relaxed about 2% of its maximum width in a heat-set oven set at 460° F. The finished film thickness was 1.8 mil.

Figure 9:
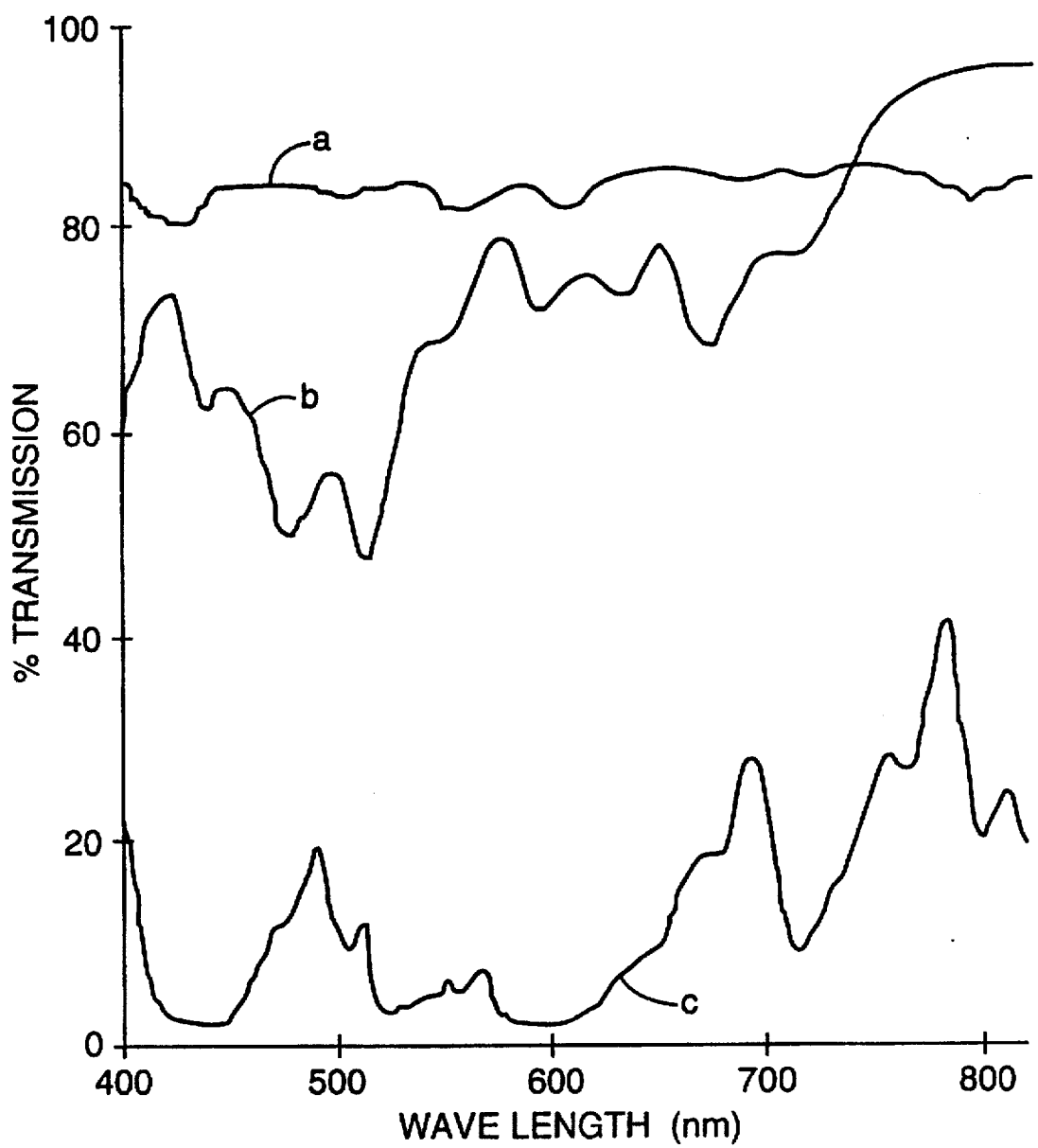
FIGS. 9–11 show the optical performance of multilayer polarizers given in Examples 5–7.

The transmission of the film is shown in FIG. 9. Curve a shows transmission of light polarized in the non-stretch direction at normal incidence, curve b shows transmission of p polarized light polarized in the non-stretched direction at 60° incidence, and curve c shows transmission of light polarized in the stretch direction at normal incidence. Note the nonuniform transmission of p polarized light at both normal and 60° incidence. The average transmission for curve a over 400–700 nm is 84.1%, while the average transmission for curve b over 400–700 nm is 68.2%. The average transmission for curve c is 9.1%. The % RMS color for curve a is 1.4%, and the % RMS color for curve b is 11.2%.

EXAMPLE 6

(PEN:coPEN, 601, Polarizer)

A coextruded film containing 601 layers was made on a sequential flat-film-making line via a coextrusion process. A polyethylene naphthalate (PEN) with an Intrinsic Viscosity of 0.54 dl/g (60 wt % phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene decarboxylate methyl ester, 15% dimethyl isophthalate and 15% dimethyl terephthalate with ethylene glycol. The feedblock method was used to generate 151 layers. The feedblock was designed to produce a gradient distribution of layers with a ratio of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 10:
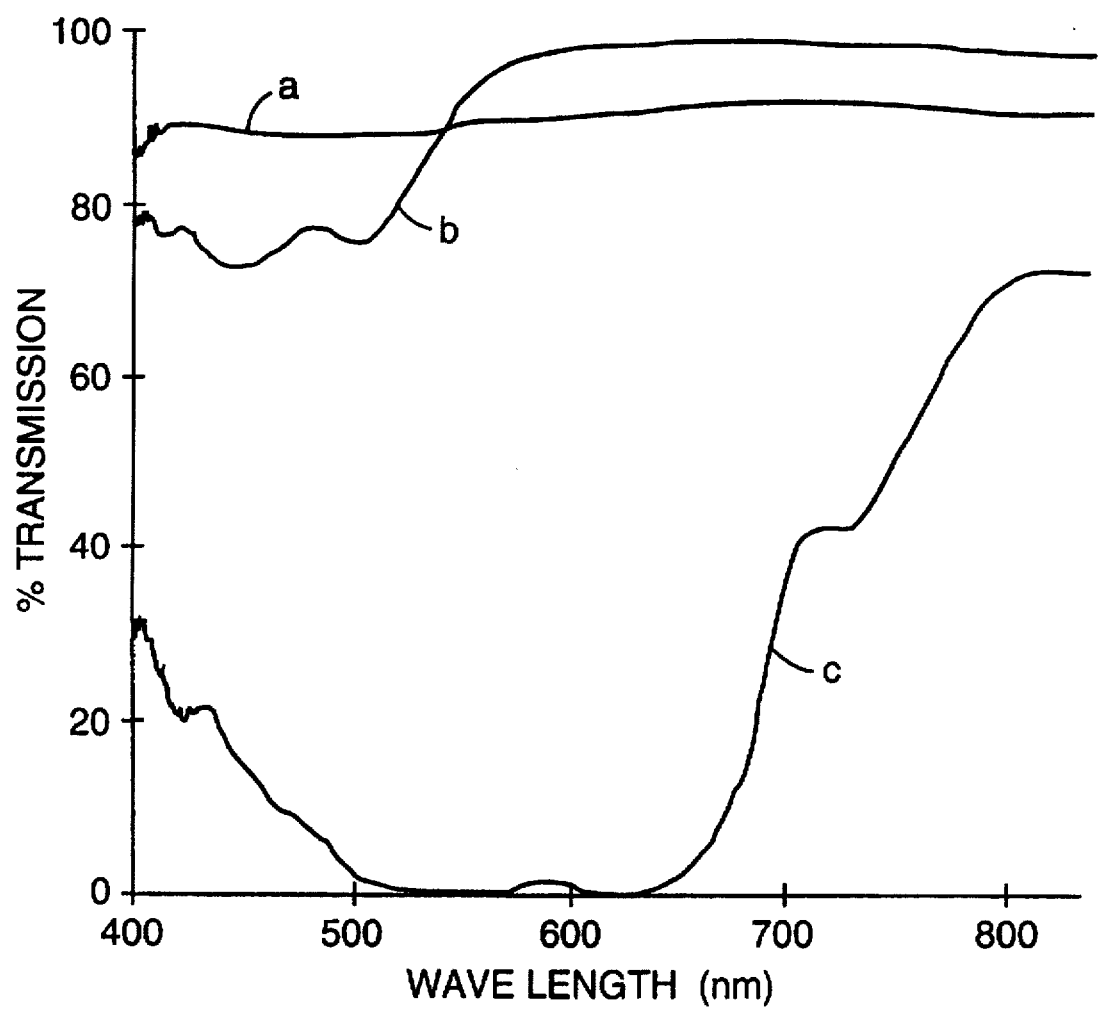

FIG. 10 shows the transmission for this multilayer film. Curve a shows transmission of light polarized in the non-stretch direction at normal incidence, curve b shows transmission of p polarized light polarized in the non-stretch direction at 60° incidence, and curve c shows transmission of light polarized in the stretch direction at normal incidence. Note the very high transmission of p polarized light at both normal and 60° incidence (80–100%). Also note the very high extinction of light polarized in the stretched direction in the visible range (400–700 nm) shown by curve c. Extinction is nearly 100% between 500 and 650 nm.

EXAMPLE 7

(PEN:sPS, 481, Polarizer)

A 481 layer multilayer film was made from a polyethylene naphthalate (PEN) with an intrinsic viscosity of 0.56 dl/g (60 wt. % phenol and 40 wt % dichlorobenzene) purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 11:
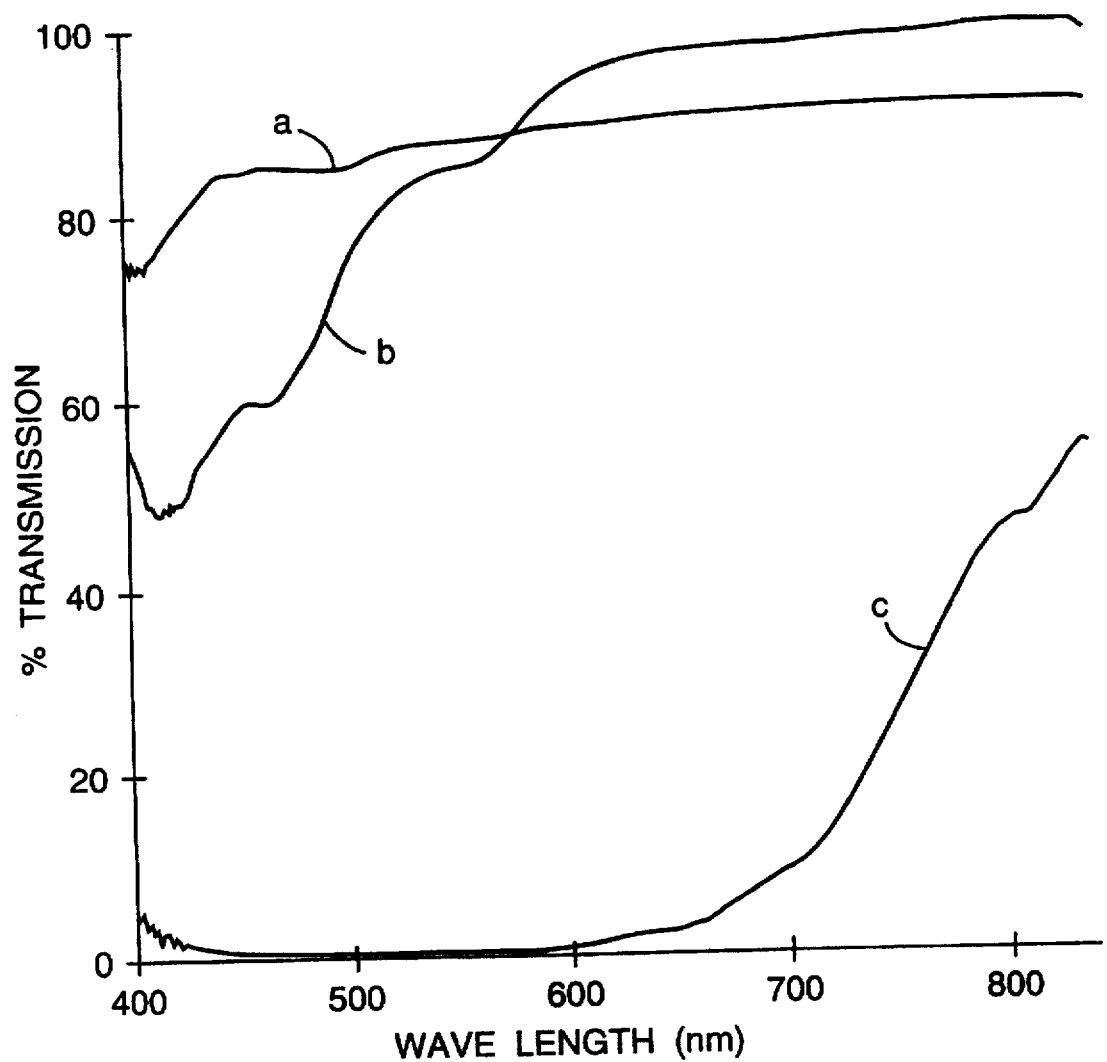

FIG. 11 shows the optical performance of this PEN:sPS reflective polarizer containing 481 layers. Curve a shows transmission of light polarized in the non-stretch direction at normal incidence, curve b shows transmission of p polarized light polarized in the non-stretched direction at 60° incidence, and curve c shows transmission of light polarized in the stretch direction at normal incidence. Note the very high transmission of p polarized light at both normal and 60° incidence. Average transmission for curve a over 400–700 nm is 86.2%, the average transmission for curve b over 400–700 nm is 79.7%. Also note the very high extinction of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 8

(PET:Ecdel, 601, Mirror)

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to the feedblock at a rate of 75 pounds per hour and Ecdel 9967 (a thermoplastic elastomer available from Eastman Chemical) was delivered at a rate of 60 pounds per hour. The PET was on the skin layers. The feedblock method was used to generate 151 layers which was passed through two multipliers producing an extrudate of 601 layers. The multipliers had a nominal multiplication ratio of 1.2 (next to feedblock) and 1.27. Two skin layers at a total throughput of 24 pounds per hour were added symmetrically between the last multiplier and the die. The skin layers were composed of PET and were extruded by the same extruder supplying the PET to the feedblock. The web was length oriented to a draw ratio of about 3.3 with the web temperature at about 205° F. The film was subsequently preheated to about 205° F. in about 35 seconds and drawn in the transverse direction to a draw ratio of about 3.3 at a rate of about 9% per second. The film was then relaxed about 3% of its maximum width in a heat-set oven set at 450° F. The finished film thickness was about 0.0027 inches.

Figure 12:
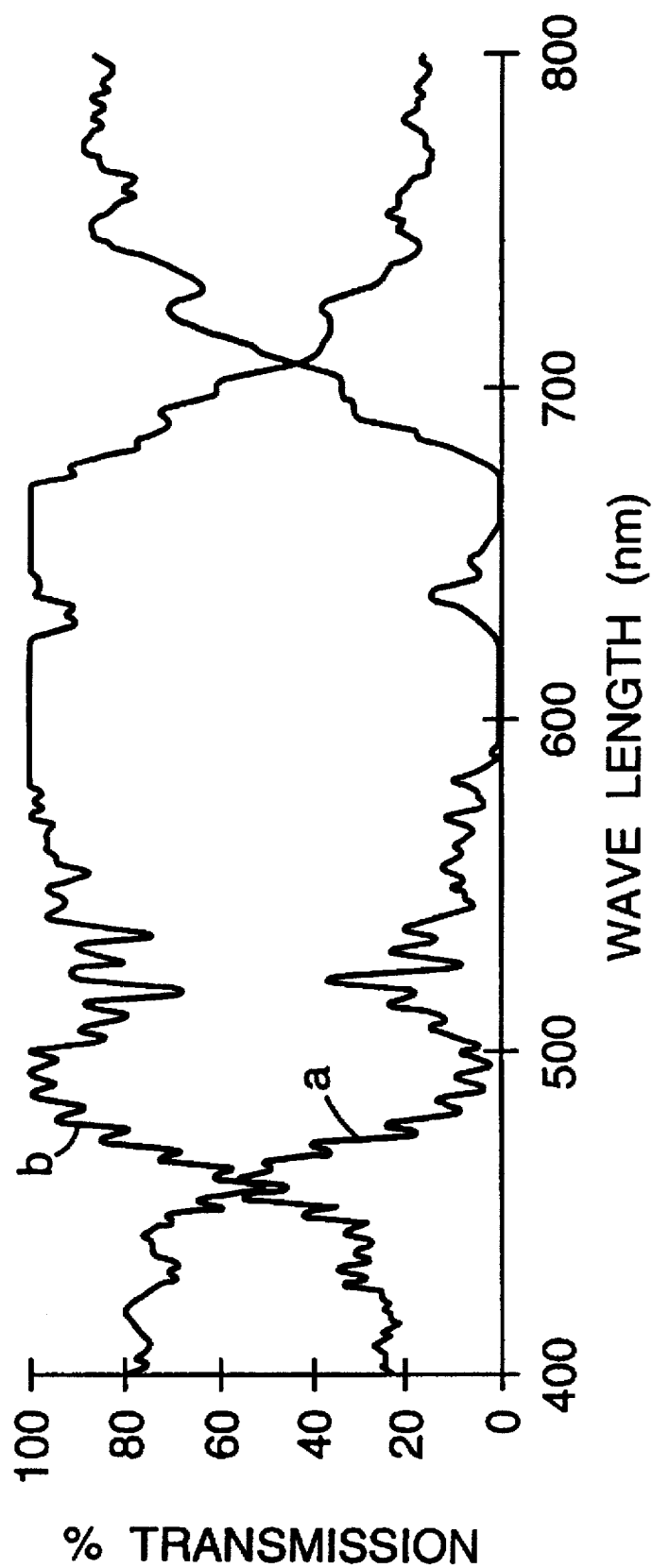
FIG. 12 shows the optical performance of the multilayer mirror given in Example 8.

The film provided the optical performance as shown in FIG. 12. Transmission is plotted as curve a and reflectivity is plotted as curve b. The luminous reflectivity for curve b is 91.5%.

EXAMPLE 9

(PEN:PCTG, 481, Polarizer)

A coextruded film containing 481 layers was made by extruding the cast web in one operation and later orienting the film in a laboratory film-stretching apparatus. The feedblock method was used with a 61 layer feedblock and 3 (2×) multipliers. Thick skin layers were added between the final multiplier and the die. Polyethylene naphthalate (PEN) with an Intrinsic Viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman Chemical) was delivered by another extruder at a rate of 25.0 pounds per hour. PEN was on the skin layers. Another stream of PEN from the above extruder was added as skin layers at a rate of 25 pounds per hour. The cast web was 0.007 inches thick and 12 inches wide. The web was later uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching then commenced at 20%/sec (based on original dimensions) until the sample was stretched to about 6:1 (based on gripper-to-gripper measurements). Immediately after stretching, the sample was cooled by blowing room temperature air at it. In the center of the sample the film was found to relax by a factor of 2.0.

Figure 13:
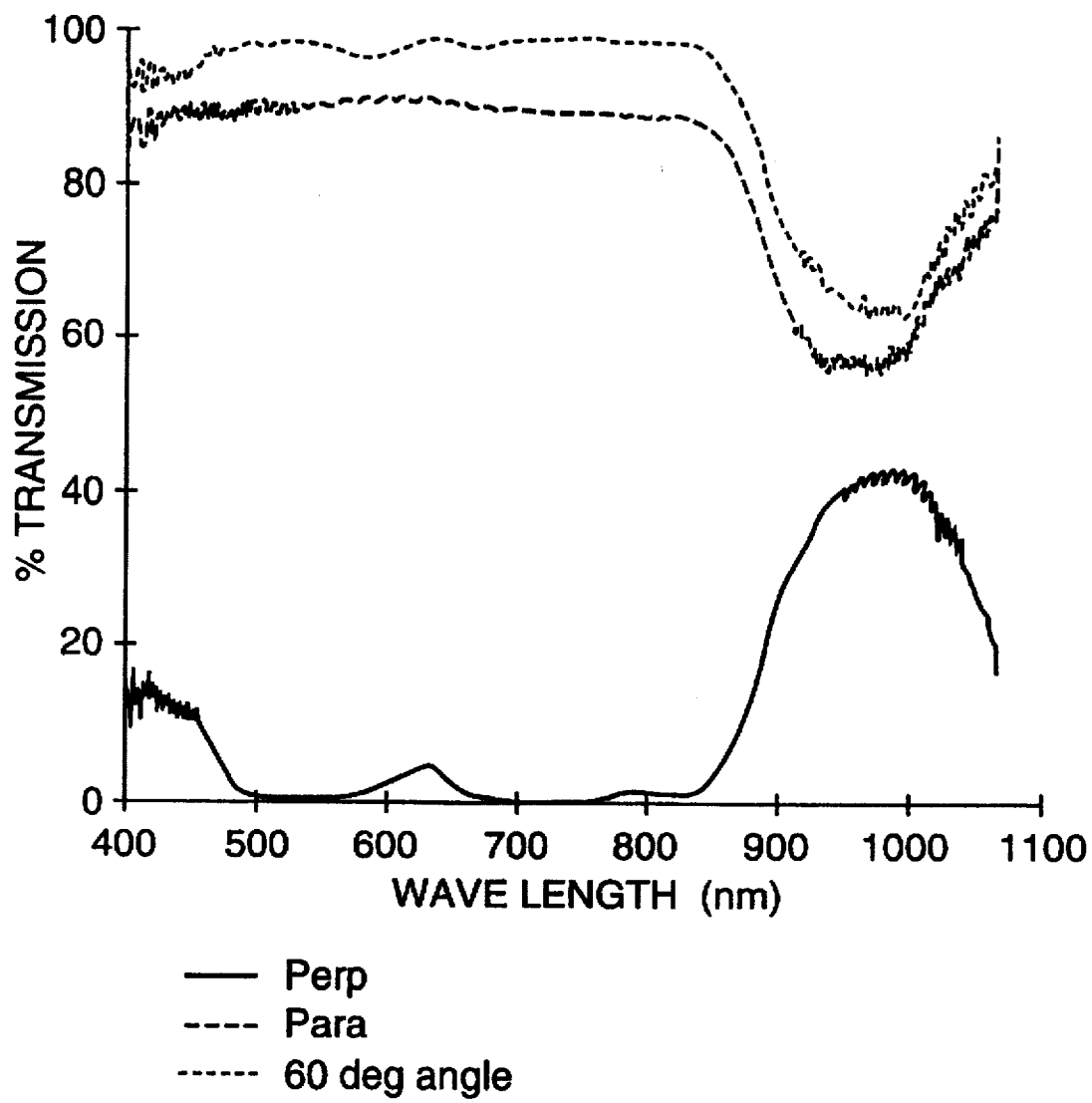
FIG. 13 shows the optical performance of the multilayer polarizer given in Example 9.

FIG. 13 shows the transmission of this multilayer film where curve a shows transmission of light polarized in the non-stretch direction at normal incidence, curve b shows transmission of p polarized light polarized in the non-stretch direction at 60° incidence, and curve c shows transmission of light polarized in the stretch direction at normal incidence.

EXAMPLE 10

(PET:Ecdel, 151, Ag-Coated and Al-Coated Mirror)

A coextruded film containing 151 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to a feedblock by one extruder at a rate of 75 pounds per hour and Ecdel 9966 (a thermoplastic elastomer available from Eastman Chemical) was delivered to the feedblock by another extruder at a rate 65 pounds per hour. The feedblock method was used to generate 151 layers with a casting wheel speed of 10 ft./min. The skin layers were PET and were thicker than the internal layers, with the skin layers accounting for about 8% of the film's thickness. The web was length oriented to a draw ratio of about 3.5 with the web temperature at about 210° F. The film was subsequently preheated to about 212° F. in about 12 seconds and drawn in the transverse direction to a draw ratio of about 4.0 at a rate of about 25 percent per second. The film was then relaxed about 5% of its maximum width in a heatset oven at 400° F. in about 6 seconds. The finished film thickness was about 0.6 mil. The thickness of this multilayered polymer film was selected to be reflective in the visible region of the spectra.

This multilayered polymer reflecting film was vacuum metalized in a continuous multichamber vacuum coater. One multilayered polymer reflecting film was coated with aluminum evaporated from an aluminum oxide crucible heated by a tungsten filament. The web speed was 10 ft/min and was not backed with a chillroll. The aluminum layer was coated to a transmission level of 0.5% at 550 nm and a conductivity of 0.25 mhos/sq. A second multilayered polymer reflecting film was coated with silver evaporated from an aluminum oxide crucible heated by a tungsten filament. The web speed was 10 ft/min and the substrate was not chilled with a chillroll. The silver layer was coated to a transmission level of 0.5% at 550 nm and a conductivity of 2.6 mhos/sq. Both films were adherent to the multilayered polymer reflecting film, passing a standard tape removal test, ASTM Tape Removal Test B571. In addition, after metalizing a noticeable improvement could be seen by the naked eye in the visible reflection of both mirrors which appeared to be uniformly reflective as compared to visible coloration of the uncoated multilayered polymer reflective films with a non-repeating pattern shifting with the angle of observation.

These mirrors were then characterized by measuring their optical spectra reflection in a Perkin Elmer λ-9. An analysis of the results is shown in the Table I below. $R_{lum}$ is the measured reflectivity of the sample that is integrated over the wavelength sensitivity of the human eye. The dominant wavelength is the apparent color of the sample that is calculated with CIE techniques using Illuminant C and the 10° observer according to ASTM E308 "Standard Test Method For Computing The Colors of Objects Using the CIE System". The color purity is the saturation of the color, with 0% being white and 100% being a pure color. The multilayered polymer reflecting film before metalization is highly colored and has a modest luminous reflection. When metalized with either silver or aluminum, the luminous reflection of both metal-coated multilayer mirrors is greater than 90%. Both mirrors have a higher reflectivity than a PET film metalized with aluminum. The color purity of the metal-coated multilayer mirrors is substantially lower than that of the uncoated multilayered polymer reflecting film.

TABLE I

Integrated Reflectivity of Metal-Coated Multilayer Mirror and PET Substrate, Measured from the Substrate Side

| Sample | Total $R_{lum}$ (%) | Dominant Wavelength (nm.) | Purity (%) |
|---|---|---|---|
| Multilayer Optical Film | 70.1 | 572 | 53.7 |
| Ag coated Multilayer Optical Film | 97.9 | 568 | 1.8 |
| Ag coated PET | 95.8 | 571 | 2.4 |
| Al coated Multilayer Optical Film | 90.9 | 533 | 3.3 |
| Al coated PET | 82.1 | 493 | 0.1 |

All of the measurements shown in Table I were made with light incident on the polymer side of the sample. Typically, aluminum coatings on PET films are 4 percent more reflective and silver films are 1 percent more reflective when viewed from the metal side. In contrast to this, metal-coated multilayer mirrors are more reflective when viewed from the polymer side. The side-to-side differences for metal-coated multilayer mirrors are more pronounced when the metal is aluminum than when it is silver.

Figure 14:
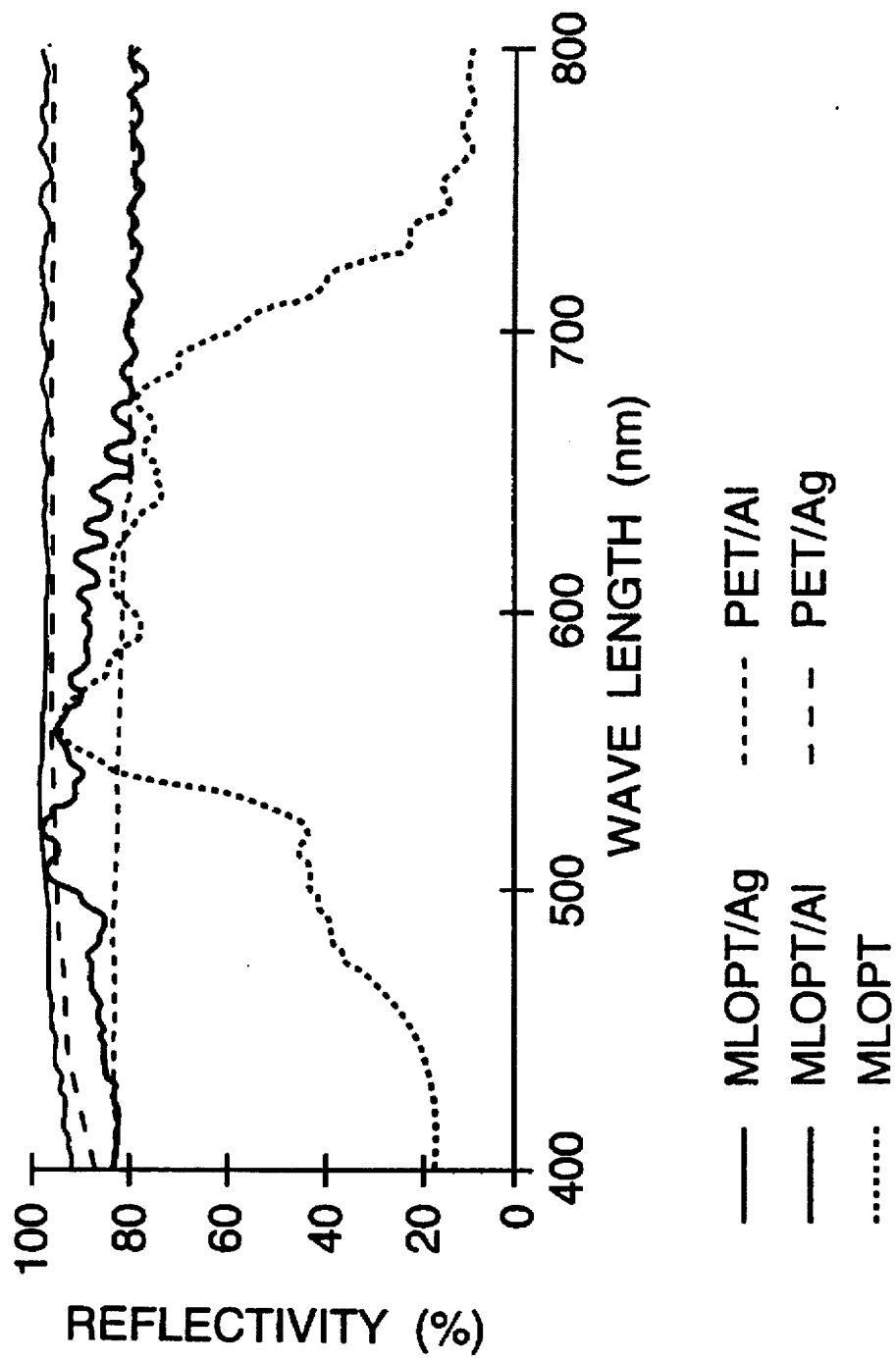
FIG. 14 shows the optical performance of the metal-coated multilayer mirror of Example 10.

FIG. 14 is a spectra from the aluminum and silver coated multilayer mirrors discussed above. Initially, it should be noted that this particular mirror construction is less than optimum in that a wider reflective band can be achieved by using more layers and a greater distribution of quarterwave reflectors. Additionally, a higher reflectivity in the reflective band can be achieved by using polymers with a larger index change or by using more layers. Nonetheless, the spectra clearly shows that the reflective metal coating adds reflection to the portions of the visible spectrum not already covered by the multilayered polymer film.

EXAMPLE 11

(PET:Ecdel Film laminated to Al Substrate

To evaluate metal laminated multilayer mirrors of the present invention multilayered polymer films as described in Example 1, with skin layers coextruded on the outside of the optical stack with a total thickness of about 14% of the coextruded layers, were laminated to Everbrite® Lighting Sheet Aluminum, available from the Sheet and Plating Division of Aluminum Company of America, Bettendorf, Iowa, using a 95/5 IOA/acrylamide acrylic pressure sensitive adhesive from 3M Company, St. Paul, Minn. 55144, which is commonly used on Scotchtint® films.

These multilayer film, aluminum backing, and multilayer film/aluminum laminate were then characterized by measuring their optical spectra reflection in a Perkin Elmer λ-9. An analysis of the results is shown in Table II below. $R_{lum}$ is the measured reflectivity of the sample that is integrated over the wavelength sensitivity of the human eye. The dominant wavelength is the apparent color of the sample that is calculated with CIE techniques using Illuminant C and the 10° observer according to ASTM E308 "Standard Test Method For Computing The Colors of Objects Using the CIE System". The color purity is the saturation of the color, with 0% being white and 100% being a pure color. The mirror gloss, which is an indication of specular reflectance, was measured using a Pocket Gloss Specular 60 Mirror-Gloss Meter from BUIK-Gardner, Inc., Silver Spring, Md.

TABLE II

Integrated Reflectivity and Color for Metalized Multilayer Film on Everbrite ® Aluminum Backing

| Sample | Total $R_{lum}$ (%) | Dominant Wavelength (nm.) | Color Purity (%) | Mirror Gloss (%) |
|---|---|---|---|---|
| Multilayer Film | 87 | 572 | 32.3 | 79.5 |
| Everbrite ® Aluminum | 88 | 482 | 0.7 | 80.6 |
| Multilayer/ Aluminum backing | 96 | 577 | 4.9 | 88.2 |

As can be seen, the reflectivity of the multilayer/aluminum laminate is significantly greater than that of either the multilayer mirror or the Everbrite® aluminum alone.

EXAMPLE 12

(PET:Ecdel, Ag-Coated and Al-Coated Mirrors)

To evaluate metal-coated multilayer mirrors of the present invention in applications using multiple reflections, vapor-coated multilayered polymer films as described in Example 16 were laminated to 3105-H14 aluminum using a 90/10 IOA/AA acrylic pressure sensitive adhesive from 3M Company, St. Paul, Minn. 55144, which is commonly used on Silverlux® films. This type of aluminum is inexpensive and lacks a specially prepared surface for higher reflectivity. It also has a high diffuse reflection and, therefore, is not useful for applications requiring geometrical reflections. Standard SS95P Silverlux® material available from the Minnesota Mining and Manufacturing Company was also prepared in this same manner.

Figure 15:
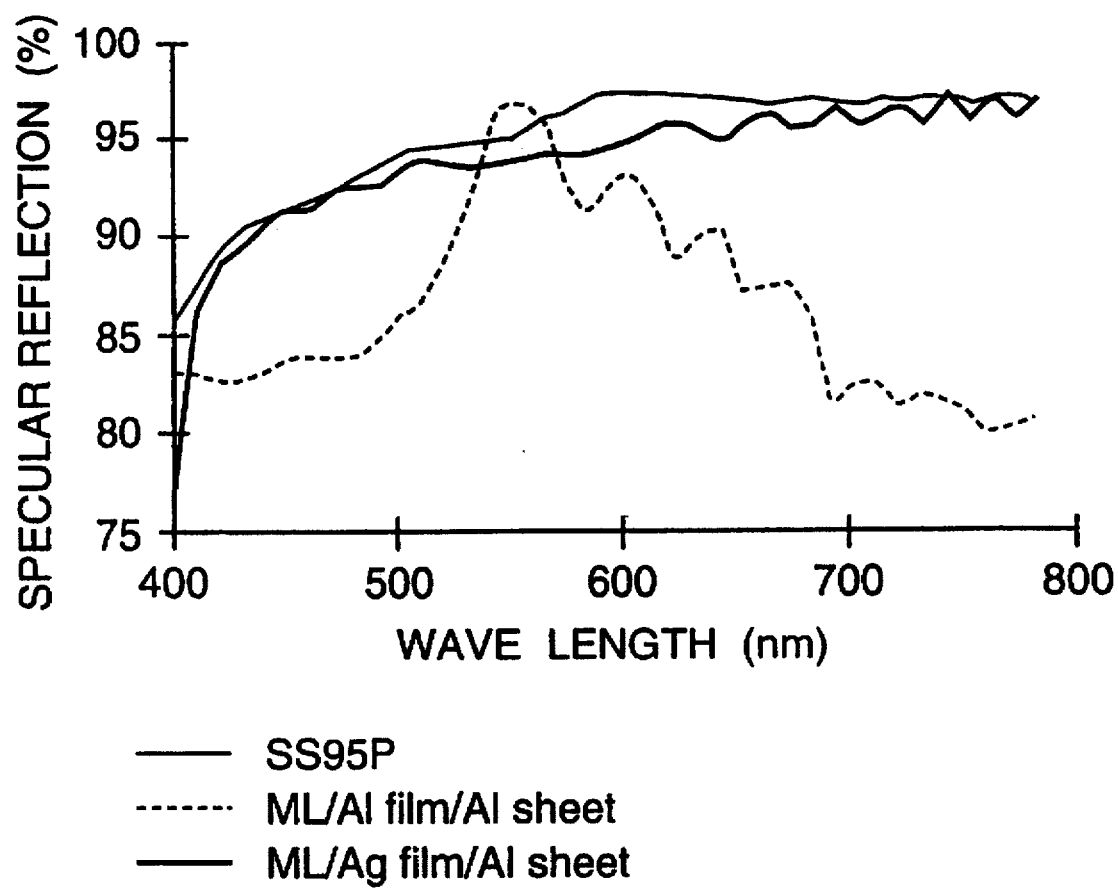
FIG. 15 shows the optical performance of the metal-coated multilayer mirror of Example 12.

The spectral curves of laminated samples and unlaminated aluminum sheeting are shown in FIG. 15. As can be seen, the silver-coated multilayered polymer mirror and the Silverlux® material have very similar reflectivities. Table III below shows the data reduced from their spectra shown in FIG. 15. As can be seen, the reflectivity of the mirrors have not suffered from this lamination process. The reflectivity of the bulk aluminum is only 72%, nearly half of which is diffuse reflection. Thus, any film applied to this backing both increases the total reflection and reduces the diffuse reflection. The mirrors of the present invention had substantially less diffuse reflection than the metal-coated Silverlux®, which provides an additional advantage to the mirrors of the present invention.

TABLE III

Integrated Reflectivity and Color for Metalized Multilayer Film, SS95P Silverlux ®, and Aluminum Backing, All Samples Applied To Aluminum Backing

| Sample | Total $R_{lum}$ (%) | Dominant Wavelength (nm.) | Color Purity (%) | Diffuse Reflection (%) |
|---|---|---|---|---|
| SS95P Silverlux ® | 98.7 | 574 | 0.3 | 2.5 |
| Al coated Multilayer/Al backing | 92.6 | 566 | 3.3 | 0.5 |
| Ag coated Multilayer/Al backing | 97.6 | 574 | 1.5 | 0.9 |
| Al Backing 3105-H14 | 72.3 | 574 | 2.2 | 31.6 |

Other modifications and variations of the present invention are possible in light of the above teachings. For example, additives and other modifying agents, such as UV absorbers, may be added to one or more of the layers of the multilayered polymer films used in the present invention. It is to be understood, however, that changes may be made in the particular embodiments described above which are within the full intended scope of the invention as defined in the appended claims.

What is claimed is:

1. A metal-coated multilayer mirror comprising a multi-layered polymer film and a metal layer;
    the multilayered-polymer film comprising:
    (A) layers of a birefringent semi-crystalline having an average thickness of not more than 0.5 microns; and
    (B) layers of a selected second polymer having an average thickness of not more than 0.5 microns;
    and the metal layer comprising a reflective metal.

2. The mirror of claim 1 wherein the birefringent polymer is semi-crystalline naphthalene dicarboxylic acid polyester.

3. The mirror of claim 2 wherein the reflective metal is selected from the group consisting of aluminum, silver, gold, copper, nickel, and titanium.

4. The mirror of claim 2 wherein the metal is silver.

5. The mirror of claim 4 wherein the silver layer has a thickness of at least about 75 nm to about 100 nm.

6. The mirror of claim 2 wherein the metal is aluminum.

7. The mirror of claim 6 wherein the aluminum layer has a thickness of at least about 20 nm to about 100 nm.

8. The mirror of claim 2 wherein the reflective metal is coated on the multilayered polymer film by vapor deposition or cathode sputtering.

9. The mirror of claim 2 wherein the reflective metal comprises a metalized polymer or glass sheet that is laminated to the multilayered polymer film.

10. The mirror of claim 2 wherein the reflective metal comprises a metal sheet laminated to the multilayered polymer film.

11. The mirror of claim 2 wherein its reflectivity of visible light is greater than 90%.

12. The mirror of claim 2 wherein its reflectivity of visible light is greater than 95%.

13. The mirror of claim 2 wherein the naphthalene dicarboxylic acid polyester is more positively birefringent than the second polymer.

14. The mirror of claim 2 wherein the layers of the naphthalene dicarboxylic acid polyester and the layers of the second polymer are immediately adjacent alternating layers.

15. The mirror of claim 2 wherein there are at least 50 of each of the layers of the naphthalene dicarboxylic acid polyester and the layers of the second polymer.

16. The mirror of claim 2 wherein the film has been stretched in at least one direction.

17. The mirror of claim 16 wherein the film has been stretched in at least one direction to at least twice that direction's unstretched dimension.

18. The mirror of claim 17 wherein the layers of the naphthalene dicarboxylic acid polyester having a higher index of refraction associated with at least one in-plane axis than the layers of the second polymer.

19. The mirror of claim 18 wherein the higher index of refraction is at least 0.05 higher.

20. The mirror of claim 18 wherein the higher index of refraction is at least 0.10 higher.

21. The mirror of claim 18 wherein the higher index of refraction is at least 0.20 higher.

22. The mirror of claim 2 wherein the film has been stretched in at least two directions.

23. The mirror of claim 2 wherein the naphthalene dicarboxylic acid polyester is a poly(ethylene naphthalate).

24. The mirror of claim 2 wherein the naphthalene dicarboxylic acid polyester is a copolyester comprising naphthalate units and terephthalate units.

25. The mirror of claim 2 wherein the second polymer is a polyester.

26. The mirror of claim 25 wherein the second polymer includes naphthalene units.

27. The mirror of claim 2 wherein the second polymer is a copolyester comprising naphthalate units and terephthalate units.

28. The mirror of claim 2 wherein the second polymer is selected from the group consisting of a polystyrene, fluoropolymer, polyacrylate, polymethacrylate, and polyolefin.

29. A metal-coated multilayer mirror comprising a multilayered polymer film and a metal layer;
the multilayered polymer film comprising:
(A) layers of a birefringent semi-crystalline polymer having an average thickness of not more than 0.5 microns; and
(B) layers of a selected second polymer having an average thickness of not more than 0.5 microns;
wherein the film has been stretched in at least one direction to at least twice that direction's unstretched dimension;
and the metal layer comprising a reflective metal.

30. The mirror of claim 29 wherein the reflective metal is selected from the group consisting of aluminum, silver, gold, copper, nickel, and titanium.

31. The mirror of claim 29 wherein the metal is silver.

32. The mirror of claim 31 wherein the silver layer has a thickness of at least about 75 nm to about 100 nm.

33. The mirror of claim 29 wherein the metal is aluminum.

34. The mirror of claim 33 wherein the aluminum layer has a thickness of at least about 20 nm to about 30 nm.

35. The mirror of claim 29 wherein the reflective metal is coated on the multilayered polymer film by vapor deposition or cathode sputtering.

36. The mirror of claim 29 wherein the reflective metal comprises a metalized polymer or glass sheet that is laminated to the multilayered polymer film.

37. The mirror of claim 29 wherein the reflective metal comprises a metal sheet laminated to the multilayered polymer film.

38. The mirror of claim 29 wherein its reflectivity of visible light is greater than 90%.

39. The mirror of claim 29 wherein its reflectivity of visible light is greater than 95%.

40. The mirror of claim 29 wherein the polyester is a poly(alkylene terephthalate).

41. The mirror of claim 29 wherein the second polymer is a polyester.

42. The mirror of claim 29 wherein the layers of a polyester and the layers of a second polymer are immediately adjacent alternating layers.

43. The mirror of claim 29 wherein there are at least 50 of each of the layers of a polyester and the layers of a second polymer.

44. The mirror of claim 24 wherein the film has been stretched in least two directions.

* * * * *

UNITED STATES PATENT AND TRADEMARK OFFICE
CERTIFICATE OF CORRECTION

PATENT NO.: 5,699,188

DATED: December 16, 1997

INVENTOR(S): Laurence R. Gilbert et al.

It is certified that error appears in the above-identified patent and that said Letters Patent is hereby corrected as shown below:

Column 18, line 4 of claim 1, after the word "semi-crystalline" insert --polymer--.

Signed and Sealed this

Twenty-sixth Day of May, 1998

Attest:

BRUCE LEHMAN

Attesting Officer

Commissioner of Patents and Trademarks